United States Patent
Bartlett et al.

(10) Patent No.: US 7,106,550 B2
(45) Date of Patent: Sep. 12, 2006

(54) DATA STORAGE METHOD AND APPARATUS EMPLOYING A TAPE CARTRIDGE HAVING A CARTRIDGE MEMORY

(75) Inventors: Paul Frederick Bartlett, Bristol (GB); Rhys Wyn Evans, Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/044,809

(22) Filed: Jan. 27, 2005

(65) Prior Publication Data
US 2005/0185316 A1 Aug. 25, 2005

(30) Foreign Application Priority Data
Jan. 30, 2004 (GB) ................. 0401968.3

(51) Int. Cl.
*B11B 5/584* (2006.01)
(52) U.S. Cl. .................. 360/77.12
(58) Field of Classification Search .......... None
See application file for complete search history.

(56) References Cited
U.S. PATENT DOCUMENTS 5,819,309 A 10/1998 Gray
6,674,596 B1 1/2004 Takayama
8,674,596 * 1/2004 Takayama ............... 360/69
2004/0012876 A1 * 1/2004 Tahara ................. 360/69

FOREIGN PATENT DOCUMENTS

WO WO 90/07182 6/1990
WO WO 97/29484 A2 8/1997

OTHER PUBLICATIONS

ECMA-319, Jun. 2001 Data Interchange on 12,7 mm 384-Track Magnetic Tape Cartridges Ultrium-1 Format.
Search Report dated Mar. 26, 2004.

* cited by examiner

*Primary Examiner*—Hoa T. Nguyen
*Assistant Examiner*—Mitchell Slavitt

(57) ABSTRACT

A data storage apparatus comprises a tape cartridge having a cartridge memory which is configured to store data representing a distinctive identity of the memory and data representing a distinctive identity of the cartridge. The cartridge has a data storage tape storing WORM data in a succession of data sets. Each data set is recorded with data representing a respectively associated data set information table. The data set information table includes an identifying data structure including data representing the identity of the cartridge memory and the data representing the identity of the cartridge. The integrity of all the WORM data written at any point along the tape can be checked against tampering by reference to the data structure that is recorded with each WORM data set.

19 Claims, 7 Drawing Sheets

DATA STORAGE METHOD AND APPARATUS EMPLOYING A TAPE CARTRIDGE HAVING A CARTRIDGE MEMORY

TECHNICAL FIELD

This invention concerns methods and apparatus for storing data, and more specifically to data storage methods and apparatus which employ a tape cartridge having a cartridge memory.

CLAIM TO PRIORITY

This application claims priority to copending United Kingdom utility application entitled, "DATA STORAGE METHOD AND APPARATUS EMPLOYING A TAPE CARTRIDGE HAVING A CARTRIDGE MEMORY," having serial no. GB 0401968.3, filed Jan. 30, 2004, which is entirely incorporated herein by reference.

BACKGROUND

Tape cartridges in use today incorporate a magnetic tape having data tracks for recording a succession of units of information known as data sets. Each data set consists of a data region within which data is recorded and a data set information table that describes the content of the data region. Data to be recorded is sent to the cartridge by a tape drive and is recorded within the data regions. The data set information table for each data set has a multiplicity of fields each of which has a pre-allocated number of bytes of storage. The fields store records of information such as the data set number, the valid data length, the data set type, and the drive manufacturer identity.

Data written to the tape may be protected from being overwritten. Such data is protected by drive level processing that renders the tape as write-once-read many (WORM) protected. When trying to protect data written to tape in a WORM environment, safeguards are implemented to prevent the data from being overwritten, accidentally or intentionally.

Tape cartridges typically comprise a memory device such as a memory circuit which is mounted in the casing of the tape cartridge. Such a device is usually referred to as a "cartridge memory". The cartridge memory typically comprises a memory circuit module such as an EEPROM semiconductor memory chip and a transponder. The transponder is powered by and exchanges information with a reader/writer device via an inductively coupled interface. The cartridge memory can be used to store many types of information including usage information, cartridge manufacturer information and cartridge memory manufacturer information. The cartridge manufacturer information includes the cartridge type, a serial number of the cartridge and an identification of the manufacturer. The cartridge memory manufacturer information includes the serial number of the transponder, the type of transponder and the serial number of the cartridge memory.

The safeguards to prevent overwriting of WORM protected data include providing information in the cartridge memory to inform the drive that the cartridge is WORM protected. It may however be possible to tamper with the cartridge so that either information in the cartridge memory is altered or the cartridge memory is swapped for another such memory, thereby allowing the unauthorised overwriting of data that should be WORM protected.

U.S. Pat. No. 6,674,596 describes a tape drive unit that stores data in a magnetic tape cartridge incorporating a cartridge memory built into the cartridge. A cartridge serial number is stored in the cartridge memory and is written on the magnetic tape. When the cartridge is loaded into a tape drive, the serial numbers are compared and reading data from or writing data to the tape is inhibited if the cartridge serial number in the memory does not coincide with the cartridge serial number on the tape.

SUMMARY

According to the present invention, there is provided a method of recording data in data storage apparatus comprising a tape cartridge having a data storage tape and a cartridge memory which is configured to store therein data representing a distinctive identity of the cartridge, the said cartridge memory being further configured to store data representing a distinctive identity of the cartridge memory, the method comprising recording WORM data in a succession of data sets on the data storage tape, each data set including data representing a respectively associated data set information table, the data set information table including an identifying data structure including data representing both the identity of the said cartridge and the identity of the said cartridge memory.

Further according to the present invention, there is provided a data storage apparatus comprising a tape cartridge having a cartridge memory which is configured to store therein data representing a distinctive identity of the cartridge, the said cartridge memory being further configured to store data representing a distinctive identity of the cartridge memory, and a tape storing WORM data in a succession of data sets, each data set being recorded with data representing a respectively associated data set information table, the data set information table including an identifying data structure including data representing both the identity of the cartridge and the identity of the cartridge memory.

DETAILED DESCRIPTION

Figure 1:
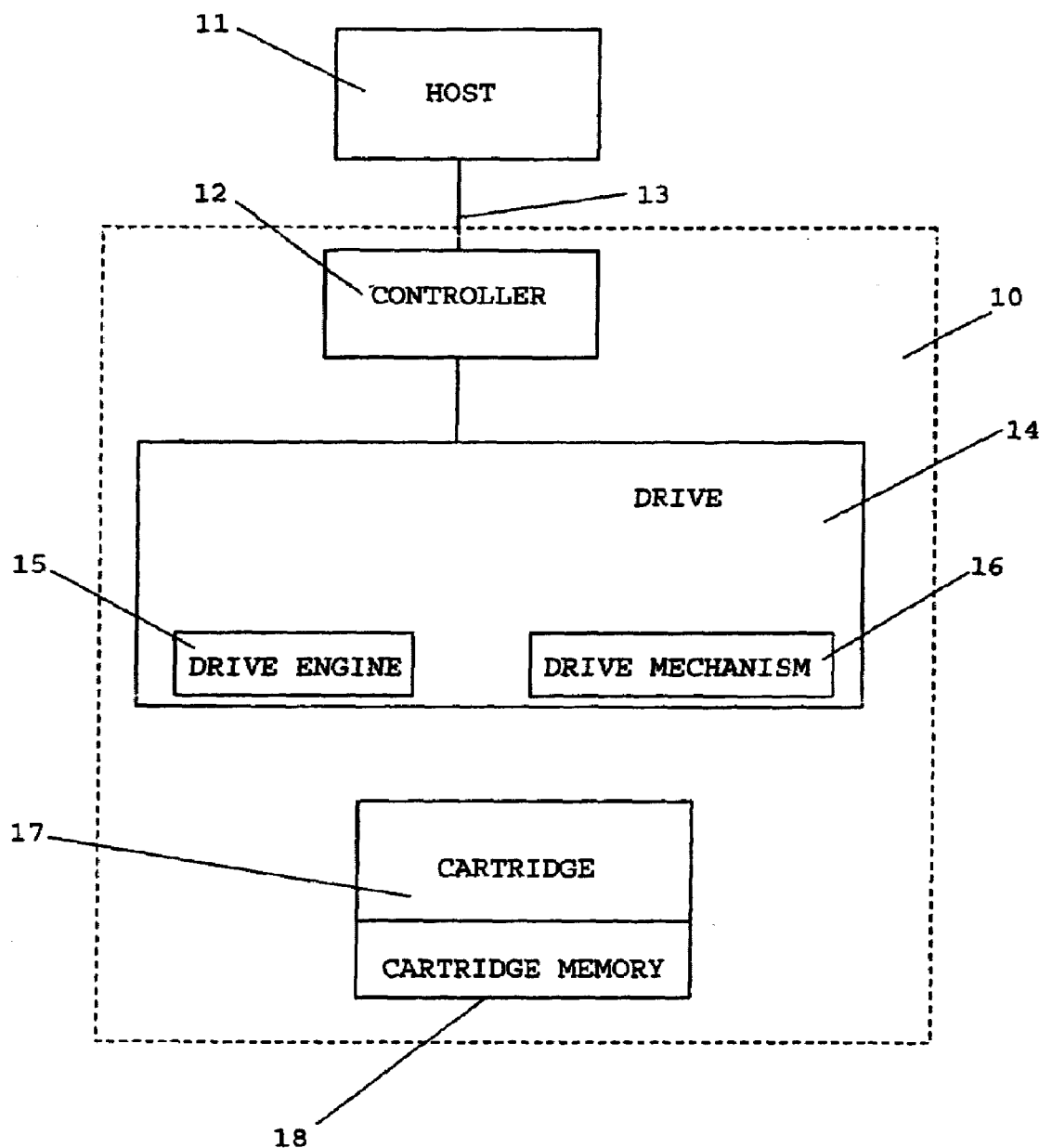
FIG. 1 is a block diagram of the hardware components and interconnections of a data storage system according to the present invention.

Referring to FIG. 1, there is shown a data storage apparatus 10 embodying the present invention coupled to at least one hierarchically superior host 11. The data storage apparatus includes a controller 12 connected to the host 11 by an interface 13. The data storage apparatus also includes a tape drive 14, including a drive engine 15 and drive mechanism 16, that receives a tape cartridge 17 that has a cartridge memory 18. A controlling software application on the host 11 controls the tape drive 14 to read data from and write data to the tape storage cartridge 17.

The host system 11 has at least one central processing unit (CPU) and a memory to store the controlling software application. The interface 13 connecting the host system 11 to the data storage apparatus 10 is preferably a Small Computer Systems Interface (SCSI) or a USB (Universal Serial Bus). The method of communication over either of these standard busses is known to those skilled in the art.

The drive mechanism 16 includes electrical and mechanical components that receive, position and access tape cartridges. The drive mechanism has components to lock a tape cartridge in place, an ejection motor and read/write heads. The drive engine 15 is a data processor that is programmed to supervise the operation of the drive mechanism 16 and to manage the flow of data to be recorded in or read from a tape cartridge 17 received in the drive 14. Importantly, the drive engine 15 controls the process of recording and reading the data to provide protection of the data as will be explained in greater detail below.

Figure 2:
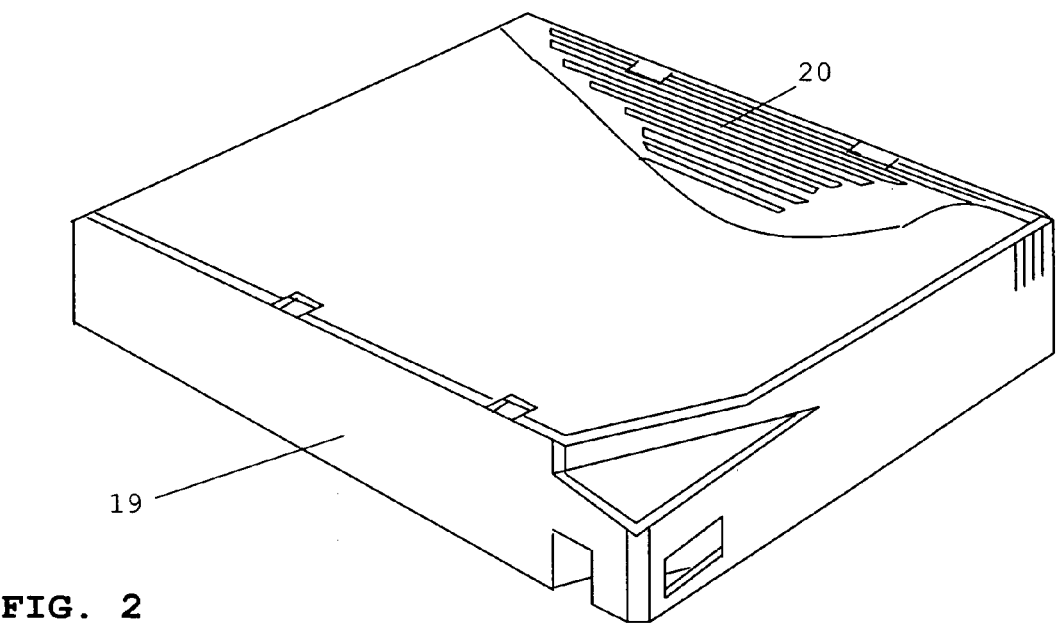
FIGS. 2 and 3 show a tape cartridge included in the system of FIG. 1.
Figure 3:
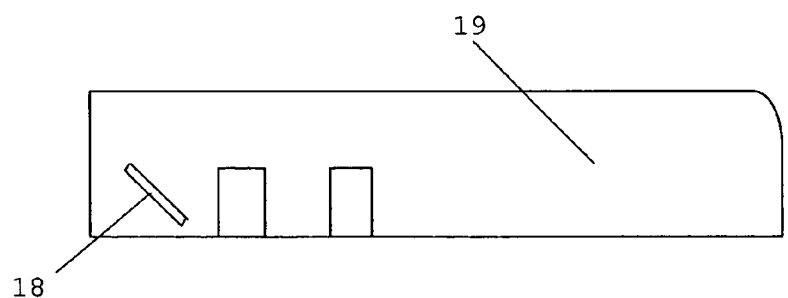

FIGS. 2 and 3, show a general view of the cartridge 17 (FIG. 1) including a structural casing 19 within which are located the cartridge memory 18 and a magnetically recordable tape 20. The cartridge is an implementation of Linear Tape Open (LTO) technology. The tape 20 is supported on a rotatable tape reel or spool and has a leader by means of which the tape drive 14 (FIG. 1) can uncoil and withdraw the tape from the cartridge reel or spool for data reading or recording.

Figure 4:
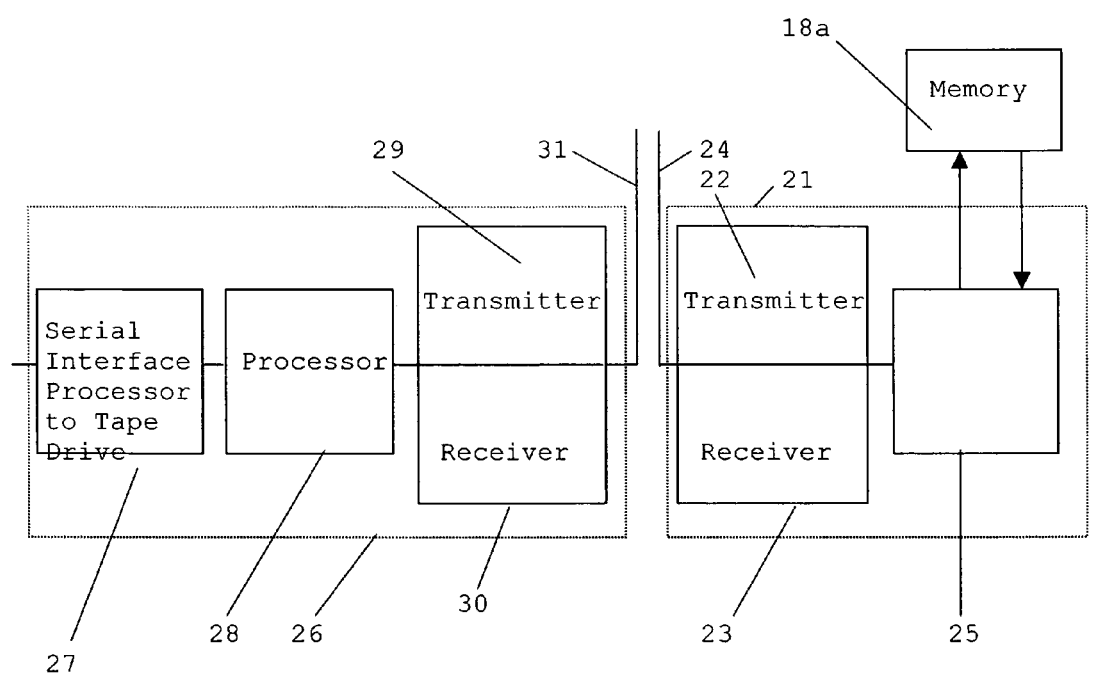
FIG. 4 is a block diagram of transponders and memory included in the data storage system of FIG. 1, FIGS. 5, 6 and 7 are diagrams of data recording on a tape included in the tape cartridge of FIGS. 2 and 3.

Referring to FIG. 4, the cartridge memory 18 (FIGS. 1 and 3) includes a transponder 21 and a memory area 18a that has the capability of non-volatile storage and is preferably an EEPROM (electronically erasable programmable read only device). The transponder 21 consists of a transmitter 22, a receiver 23, an aerial 24 and a processor 25. The cartridge memory 18 co-operates with a transmitter/receiver module 26 incorporated into the tape drive 14 (FIG. 1). The module 26 includes a serial interface 27 to the tape drive, a processor 28, a transmitter 29, a receiver 30 and an aerial 31. The transponder 21 incorporated into the cartridge 17 (FIG. 1) is inductively powered by the transmitter/receiver module 26 and data is exchanged between the transmitter/receiver 22,23 of the transponder 21 and the transmitter/receiver 29,30 of the module 26 by way of the inductively coupled aerials 24 and 31. The aerials 24 and 31 thus provide a contactless coupling of the cartridge memory 18 to the tape drive 14 for data transfer between the cartridge memory and the tape drive when the tape cartridge 17 has been received by the tape drive. In the case where the cartridge is to be WORM protected, the information provided by the cartridge memory indicates that the cartridge is WORM protected and that WORM protected data written to the tape is not to be overwritten.

The cartridge memory area 18a stores information including usage information, cartridge manufacturer information and cartridge memory manufacturer information. The cartridge manufacturer information includes the cartridge type, a serial number of the cartridge and an identification of the manufacturer. The cartridge memory manufacturer information includes the serial number of the transponder, the type of transponder and the serial number of the cartridge memory.

Figure 5:
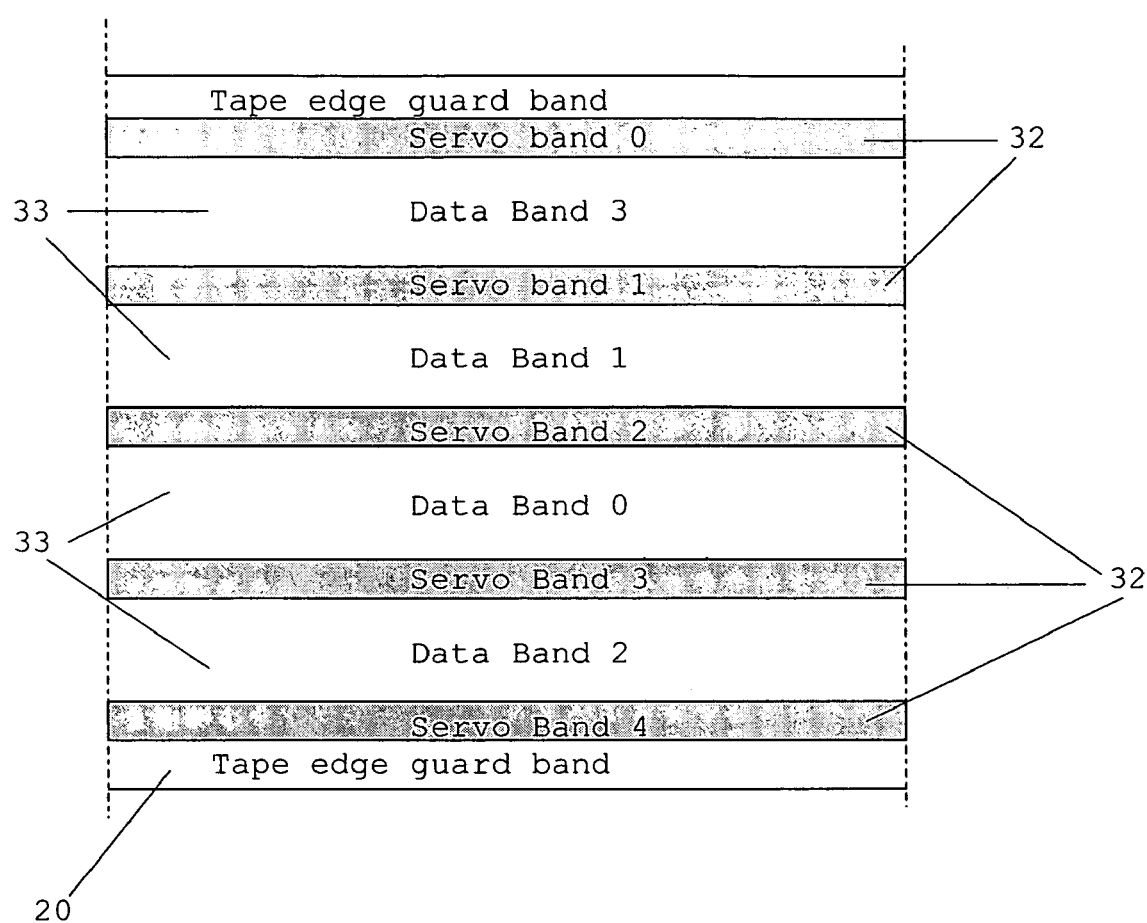
Figure 6:
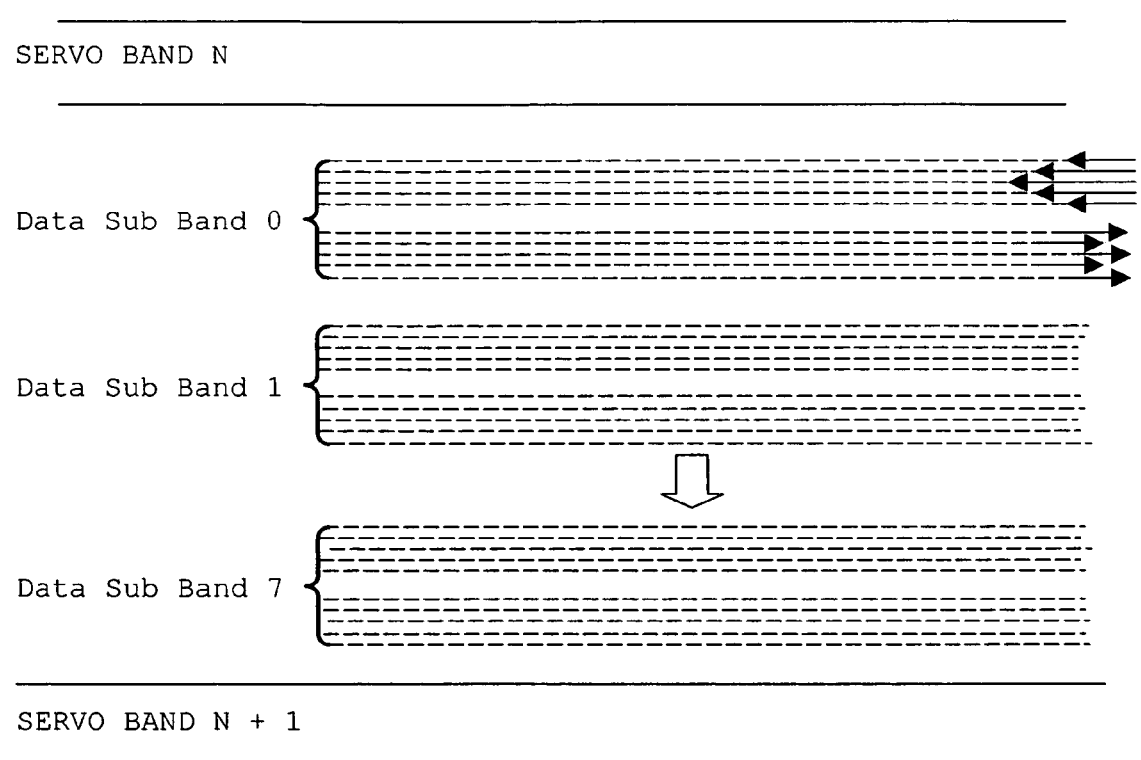

FIGS. 5 and 6 are diagrammatic representations of the manner in which data is recorded on the tape 20. Each of FIGS. 5 and 6 show a short portion only of the tape 20. There are five servo bands 32 pre-recorded on the tape 20 that are used for track following while the cartridge is being operated in the tape drive 14 (FIG. 1). The servo bands are written before the cartridge is usable for data storage and are located at predefined specific distances from one edge of the tape that is referred to as the tape reference edge. Each servo band contains servo frames encoded as longitudinal position words to provide an indication of the position down the length of the tape. In a preferred embodiment of the invention, the longitudinal position words each comprise 36 servo frames which increment in value as the tape is removed from the cartridge in the forward direction within a range from 0 to 7 529 535.

Each of the four areas between adjacent pairs of servo bands is a data band 33, the bands being numbered 2, 0, 1 and 3 respectively with data band 2 being nearest to the tape reference edge and data band 3 being furthest from the tape reference edge. The four data bands each have 128 data tracks arranged in eight data sub bands as shown in FIG. 6. The 16 data tracks in a sub band are accessed in a spiral manner in forward and reverse wraps. Forward wraps are recorded while the tape is moving from the beginning of the tape to the end of the tape and reverse wraps are recorded while the tape is moving from the end of the tape to the beginning of the tape.

Figure 7:
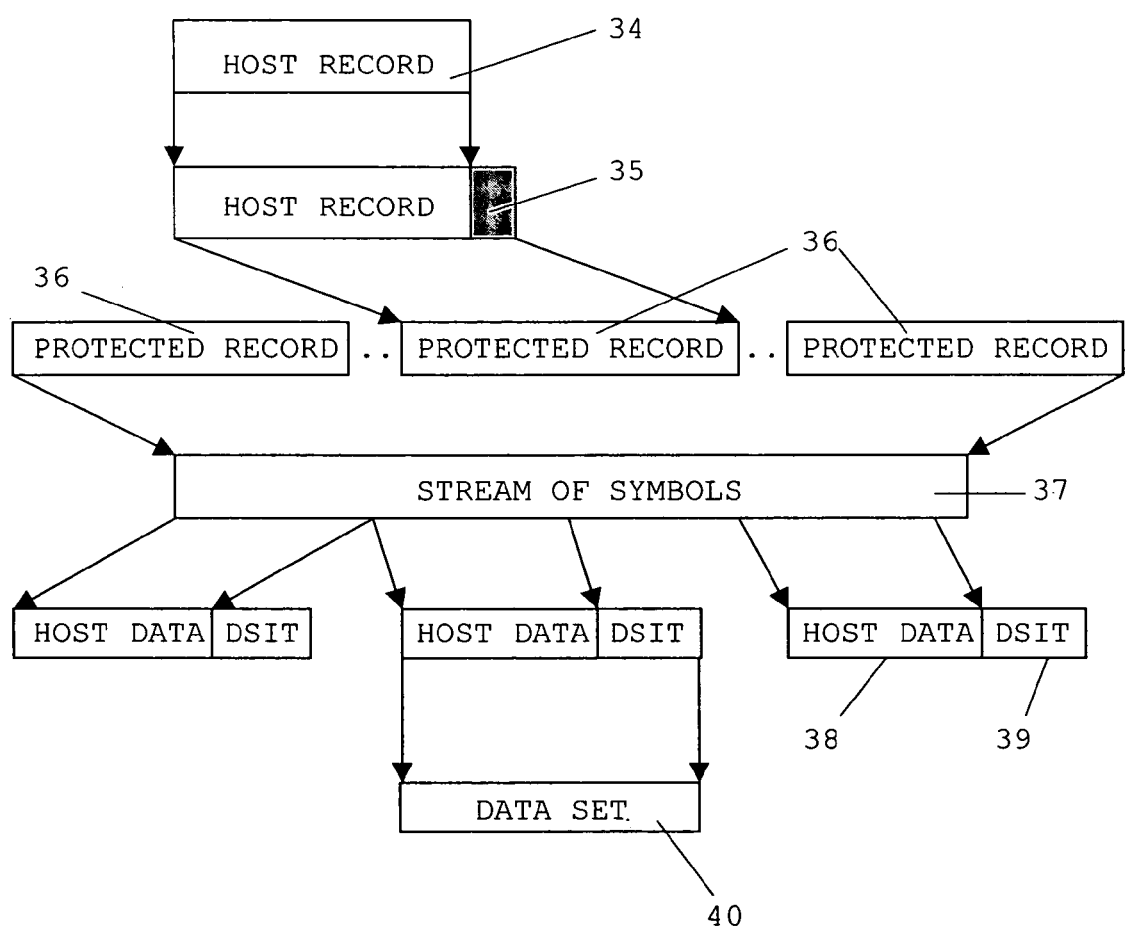

FIG. 7 shows the way in which data is transformed as it flows from the host 11 to the recorded tape 20 (FIG. 2). The data conforms to a data format in which data is logically divided into records 34 and file marks. Each record 34 is processed by the host to compute a cyclic redundancy check (CRC) character 35 that is added to the record to form a protected record 36. The CRC character is useful in the detection of errors. A data compression algorithm processes the protected records 36 and file marks to produce a stream of symbols 37 broken into sets of host data 38 to which a data set information table 39 is added. The host data and data set information table 39 together constitute a data set 40.

Despite the provision of information by the cartridge memory 18 to the drive 14 indicating that the cartridge 17 (FIG. 1) is a WORM protected cartridge, it is possible that the cartridge could be tampered with so that the information in the cartridge memory 18 is altered thereby allowing the data written to the cartridge to be at least selectively overwritten. In order to enable this form of tampering to be detected, an identifying information structure is read by the drive 14 from the cartridge memory 18 and recorded in the data set information table of every WORM protected data set during the recording process. The identifying information structure includes the data stored in the cartridge memory area 18a representing the identity of the cartridge memory 18 and the data representing the identity of the cartridge 18. As a result, the integrity of all the WORM data written at any point along the tape can be checked against tampering as will be described with reference to FIG. 8. Attempts to tamper with WORM data at just a single point or a few points on the tape will come to light.

Figure 8:
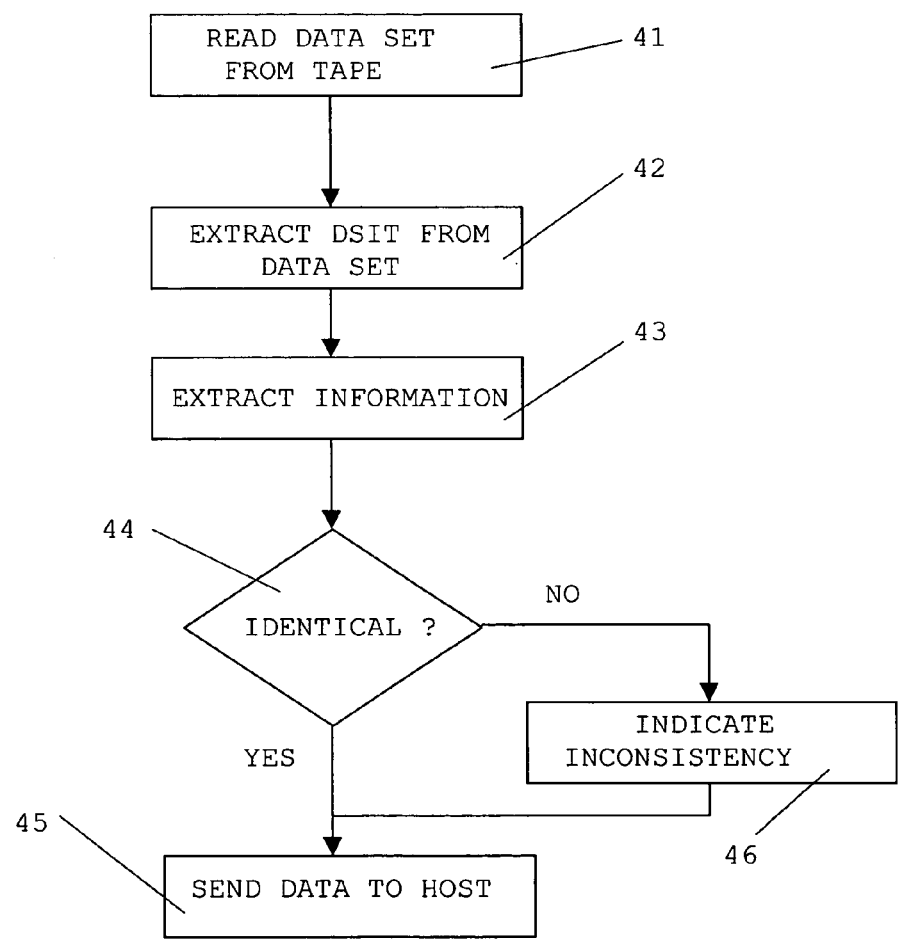
FIG. 8 is a flow diagram illustrating steps in a method embodying the present invention.

Referring to FIG. 8, in a first step 41, a data set is read from the tape 20 (FIG. 2) and in step 42 the data set information table is extracted from the data set. In step 43 the identifying information structure of each WORM protected data set is extracted from the data set and in step 44 is compared with the corresponding identifying information read from the cartridge memory 18 (FIGS. 1 and 2). If the extracted information structure is identical, the data set is sent to the host 11 (FIG. 1) in step 45. If the extracted information structure is not identical, data indicating the inconsistency is generated in step 46 and forwarded to the host 11 in step 45.

What is claimed is:

1. A method of recording data in data storage apparatus comprising a tape cartridge having a data storage tape and a cartridge memory which is configured to store therein data representing a distinctive identity of the tape cartridge, the said cartridge memory being further configured to store data representing the distinctive identity of the cartridge memory, the method comprising recording WORM data in a succession of data sets on the data storage tape, each data set including data representing a respectively associated data set information table, the data set information table including an identifying data structure including data representing both the identity of the said cartridge and the identity of the said cartridge memory, in which the identifying data structure includes data representing a cartridge type and an identification of a manufacturer of the said cartridge.

2. A method as claimed in claim 1, in which the identifying data structure includes data representing a serial number of the said cartridge.

3. A method as claimed in claim 1, in which the cartridge memory comprises a transponder and the identifying data structure includes data representing a serial number of the transponder, a type designation of the transponder and the serial number of the cartridge memory.

4. A method as claimed in claim 1 in which the data sets are recorded in data tracks accessed in a spiral manner in forward and reverse wraps, the forward wraps being recorded while moving the tape from the beginning of the tape to the end of the tape and the reverse wraps being recorded while moving the tape from the end of the tape to the beginning of the tape.

5. A method as claimed in claim 1, in winch the data sets are constituted by host data records logically separated by file marks to each of which a data set information table is added.

6. A method of recording data in data storage apparatus comprising a tape cartridge having a data storage tape and a cartridge memory comprising a transponder, the cartridge memory being configured to store therein data representing a distinctive identity of the cartridge, the said cartridge memory being further configured to store data representing the distinctive identity of the cartridge memory, the method comprising recording WORM data in a succession of data sets on the data storage tape, each data set including data representing a respectively associated data set information table, the data set information table including an identifying data structure including data representing a cartridge type, an identification of a manufacturer of the said cartridge, and the serial number of the cartridge memory.

7. A method as claimed in claim 6 in which the data sets are recorded in data cracks accessed in a spiral manner in forward and reverse wraps, the forward wraps being recorded while moving the tape from the beginning of the tape to the end of the tape and the reverse wraps being recorded while moving the tape from the end of the tape to the beginning of the tape.

8. A method as claimed in claim 6, in which the data sets are constituted by host data records logically separated by file marks to each of which the data set information table is added.

9. A data storage apparatus comprising a tape cartridge having a cartridge memory which is configured to store therein data representing a distinctive identity of the cartridge, the said cartridge memory being further configured to store data representing the distinctive identity of the cartridge memory, and a tape storing WORM data in a succession of data sets, each data set being recorded with data representing a respectively associated data set information table, the data set information table including an identifying data structure including data representing both the identity of the cartridge and the identity of the cartridge memory, in which the identifying data structure includes data representing a cartridge type and an identification of a manufacturer of the said cartridge.

10. The apparatus as claimed in claim 9, in which the identifying data structure includes a serial number of the cartridge.

11. The apparatus as claimed in claim 9, in which the cartridge memory comprises a transponder and the identifying data structure includes data representing a serial number of the transponder, a type designation of the transponder and the serial number of the cartridge memory.

12. The apparatus as claimed in claim 9, in which the data sets are recorded in data tracks accessible in a spiral manner in forward and reverse wraps, the forward wraps having been recorded while moving the tape from the beginning of the tape to the end of the tape and the reverse wraps having been recorded while moving the tape from the end of the tape to the beginning of the tape.

13. The apparatus as claimed in claim 9, in which the data sets are constituted by data records logically separated by file marks to each of which the data set information table is added.

14. A data storage apparatus comprising a tape cartridge having a cartridge memory comprising a transponder, the cartridge memory being configured to store therein data representing a distinctive identity of the cartridge, the said cartridge memory being further configured to store data representing the distinctive identity of the cartridge memory, and a tape storing WORM data in a succession of data sets, each data set including data representing a respectively associated data set information table, the data set information table including an identifying data structure including data representing a cartridge type, an identification of a manufacturer of the said cartridge, and the serial number of the cartridge memory.

15. The apparatus as claimed in claim 14 in which the data sets are recorded in data tracks accessible in a spiral manner in forward and reverse wraps, the forward wraps having been recorded while moving the tape from the beginning of the tape to the end of the tape and the reverse wraps having been recorded while moving the tape from the end of the tape to the beginning of the tape.

16. The apparatus as claimed in claim 14, in which the data sets are constituted by data records logically separated by file marks to each of which the data set information table is added.

17. A method of data retrieval to retrieve data that has been recorded in accordance with die method of claim 1, comprising the steps of reading the data sets from the tape, extracting the data set information table of each data set, and checking for the presence of the correct data representing die distinctive identity of the cartridge and the distinctive identity of the cartridge memory in each extracted data set information table.

18. A data storage apparatus including a tape drive constructed and adapted to retrieve data that has been recorded in accordance with the method of claim 1, the tape drive comprising a drive engine programmed to read the data sets from the tape, to extract the data set information table from each data set, and to check each of the extracted data set information tables for the presence of the correct data representing the distinctive identity of the cartridge and the distinctive identity of the cartridge memory.

19. A data storage apparatus comprising a tape drive and a tape cartridge having a cartridge memory which is configured to store therein data representing a distinctive identity of the cartridge, the said cartridge memory being further configured to store data representing the distinctive identity of the cartridge memory, the tape drive being programmed to record WORM data on the tape in a succession of data sets, each data set being recorded with data representing a respectively associated data set information table, the data set information table including an identifying data structure including data representing both the identity of the cartridge and the identity of the cartridge memory, the tape drive comprising a drive engine programmed to read the data sets from the tape, to extract the data set information table from each data set, and to check each of the extracted data set information tables for the presence of the correct data representing the distinctive identity of the cartridge and the distinctive identity of the cartridge memory.

* * * * *